United States Patent
Yoshida

(10) Patent No.: US 7,453,823 B2
(45) Date of Patent: Nov. 18, 2008

(54) COMMUNICATION APPARATUS AND CONTROL METHOD THEREOF

(75) Inventor: Masashi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 11/228,825

(22) Filed: Sep. 16, 2005

(65) Prior Publication Data

US 2006/0056312 A1 Mar. 16, 2006

(30) Foreign Application Priority Data

Sep. 16, 2004 (JP) ............................. 2004-269527

(51) Int. Cl.
*H04Q 7/20* (2006.01)
*H04J 3/06* (2006.01)
(52) U.S. Cl. ........................ 370/252; 370/329; 370/350; 455/426.1
(58) Field of Classification Search ................. 370/329, 370/242, 350, 252, 263, 261, 262, 312, 260; 455/556, 464, 406, 426.1, 41.1, 574; 713/300
See application file for complete search history.

(56) References Cited

U.S. PATENT DOCUMENTS

| | | | |
|---|---|---|---|
| 5,734,641 A * | 3/1998 | Kawasaki et al. ........... 370/242 |
| 6,240,080 B1 | 5/2001 | Okanoue et al. |
| 6,571,103 B1 * | 5/2003 | Novakov ..................... 455/464 |
| 2003/0157960 A1 * | 8/2003 | Kennedy ..................... 455/556 |
| 2004/0153676 A1 * | 8/2004 | Krantz et al. ............... 713/300 |
| 2004/0218580 A1 * | 11/2004 | Bahl et al. ................... 370/350 |

FOREIGN PATENT DOCUMENTS

| | | |
|---|---|---|
| JP | 11-055318 | 2/1999 |
| JP | 2003-258878 | 9/2003 |

* cited by examiner

*Primary Examiner*—Charles N Appiah
*Assistant Examiner*—Kiet Doan
(74) *Attorney, Agent, or Firm*—Cowan, Liebowitz & Latman, P.C.

(57) ABSTRACT

A communication apparatus includes a communication mode detecting unit and an IP address determining unit. The communication mode detecting unit detects whether a communication mode is a first wireless communication mode or a second wireless communication mode. The IP address determining unit (a) determines an IP address using first and second time out values if the communication mode detecting unit detects that the communication mode is the first wireless communication mode, and (b) determines an IP address using third and fourth time out values if the communication mode detecting unit detects that the communication mode is the second wireless communication mode. The first and third time out values are used for a first addressing method, and the second and fourth time out values are used for a second addressing method different from the first addressing method.

10 Claims, 13 Drawing Sheets

FIG. 3A

| TIME OUT VALUE LIST | | |
|---|---|---|
| MODE | ADDRESSING TIME OUT | |
| | DHCP | AUTO IP |
| AD HOC | 2 (sec)×1 | 2 (sec) |
| INFRASTRUCTURE | 6 (sec)×4 | 2 (sec) |

FIG. 3B

| TIME OUT VALUE LIST | |
|---|---|
| MODE | SEARCH RESPONSE TIME OUT |
| AD HOC | 3 (sec) |
| INFRASTRUCTURE | 5 (sec) |

FIG. 6A

| TIME OUT VALUE LIST | | | 601 |
|---|---|---|---|
| MODE | ADDRESSING TIME OUT | | |
| | DHCP | AUTO IP | |
| ETHER | 6 (sec)×3 | 2 (sec) | |
| WLAN | 6 (sec)×4 | 2 (sec) | |

FIG. 6B

| TIME OUT VALUE LIST | | 602 |
|---|---|---|
| MODE | SEARCH RESPONSE TIME OUT | |
| ETHER | 4 (sec) | |
| WLAN | 5 (sec) | |

FIG. 9A

| TIME OUT VALUE LIST | | |
|---|---|---|
| MODE | ADDRESSING TIME OUT | |
| | DHCP | AUTO IP |
| 1 Mbps | 8 (sec)×5 | 2 (sec) |
| 2 Mbps | 8 (sec)×4 | 2 (sec) |
| 5.5 Mbps | 7 (sec)×4 | 2 (sec) |
| 11 Mbps | 6 (sec)×4 | 2 (sec) |

FIG. 9B

| TIME OUT VALUE LIST | |
|---|---|
| MODE | SEARCH RESPONSE TIME OUT |
| 1 Mbps | 7 (sec) |
| 2 Mbps | 7 (sec) |
| 5.5 Mbps | 6 (sec) |
| 11 Mbps | 5 (sec) |

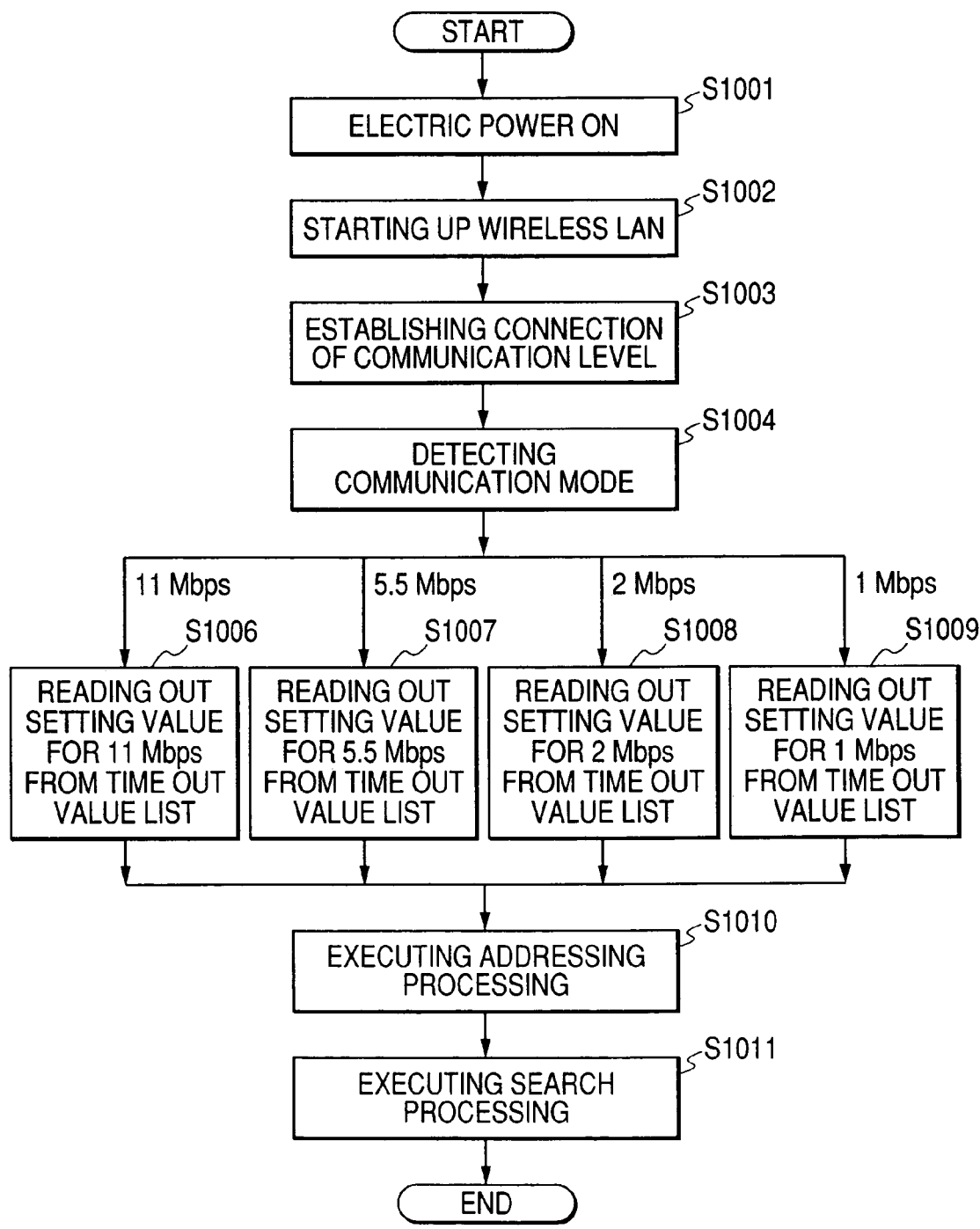

CASE 1

CASE 2

FIG. 12

| TIME OUT VALUE LIST | |
|---|---|
| REFERENCE VALUE | 5 |
| MODE | SEARCH RESPONSE TIME OUT |
| LESS THAN OR EQUAL TO REFERENCE VALUE | 3 (sec) |
| GREATER THAN REFERENCE VALUE | 5 (sec) |

1201

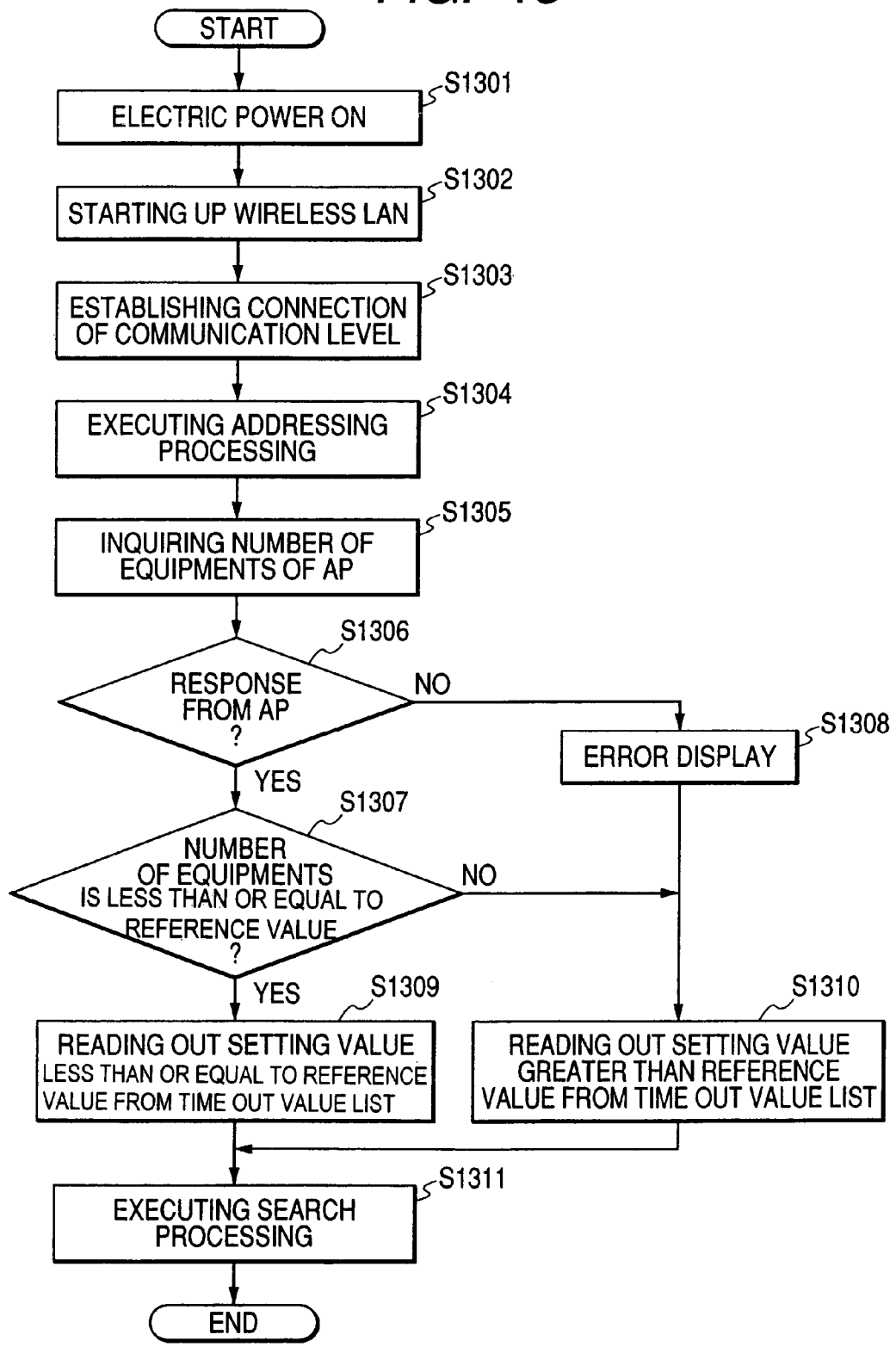

COMMUNICATION APPARATUS AND CONTROL METHOD THEREOF

BACKGROUND OF THE INVENTION

1. Field of the Invention

The present invention relates to a communication apparatus to be used for an image capture apparatus such as a digital camera and a digital video camera, a computer, and a peripheral equipments or the like and a control method thereof.

2. Description of the Related Art

Conventionally, in a communication apparatus for communicating in a plurality of communication systems, a communication control for semi-automatically deciding a plurality of communication systems by selecting a system for communication desired by a user upon start of communication or setting a priority order of a communication system in advance has been known.

There is a technology to broadcast an address request message from a terminal having a plurality of address acquisition functions when it enter a network and decide an address acquisition system hereinafter depending on the content of response and presence or absence of a response within a certain time (the longest response time when all of secure nodes in a sub net are connecting to the network), proposed in Japanese Patent Application Laid-Open No. 2003-258878 (refer to paragraphs 0055 to 0057, and FIG. 11, for example).

Further, according to Japanese Patent Application Laid-Open No. H11-55318 (refer to paragraphs 0016 to 0020, and FIGS. 1 to 3, for example), when the communication apparatus is connected to an infrastructure network which is a communication system of a wireless LAN and an AD hoc network while moving between them, the processing corresponding to the connected network is carried out by unifying a processing procedures for connection to the infrastructure network and connection to the AD hoc network in the infrastructure management processing, the connected network identification processing, and the destination address acquisition processing and discriminating a network to which the terminal is independently connected for each processing.

However, in Japanese Patent Application Laid-Open No. 2003-258878, the longest response time when all of secure nodes in a sub net are connecting to the network is defined as a time out value and an address acquisition system is decided depending on the content of response and presence or absence of a response within the time out value. Therefore, even in the case that there is no possibility that an address server is located in a network such as an AD hoc network, the processing corresponding to this longest response time is carried out, so that a responsibility is lowered and the operability of a user is also lowered.

In addition, in Japanese Patent Application Laid-Open No. H11-55318, the processing procedure is changed by discriminating whether the network to which the terminal is connected independently for each processing is the infrastructure network or the AD hoc network, and the processing load to identify the connection network for each processing is increased.

Further, since the discrimination of the connected network is carried out also by receiving a message and determining that the message is equivalent to the network address to which the terminal is connected, there is a possibility that the responsiveness is lowered.

SUMMARY OF THE INVENTION

The present invention is to overcome the above-described drawbacks. For example, according to the present invention, a time out value can be changed in accordance with various communication modes.

According to an aspect of the present invention, a communication apparatus of the present invention includes a discrimination unit adapted to discriminate the current communication mode; and a changing unit adapted to change a time out value for communication in accordance with the communication mode.

According to another aspect of the present invention, a controlling method of the present invention, of controlling a communication apparatus comprises a discrimination step of discriminating the current communication mode; and a changing step of changing a time out value for communication in accordance with the communication mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIGS. 3A and 3B are a list of a time out value according to the first embodiment of the present invention;

FIGS. 6A and 6B are a list of a time out value according to the second embodiment of the present invention;

FIGS. 9A and 9B are a list of a time out value according to the third embodiment of the present invention;

FIG. 10 is an operational flow chart of the communication control according to the third embodiment of the present invention;

FIG. 12 is a list of a time out value according to the fourth embodiment of the present invention; and FIG. 13 is an operational flow chart of the communication control according to the fourth embodiment of the present invention.

DETAILED DESCRIPTION OF THE EMBODIMENTS

Embodiments of the present invention will be described in detail below with reference to the drawings.

First Embodiment

Figure 1:
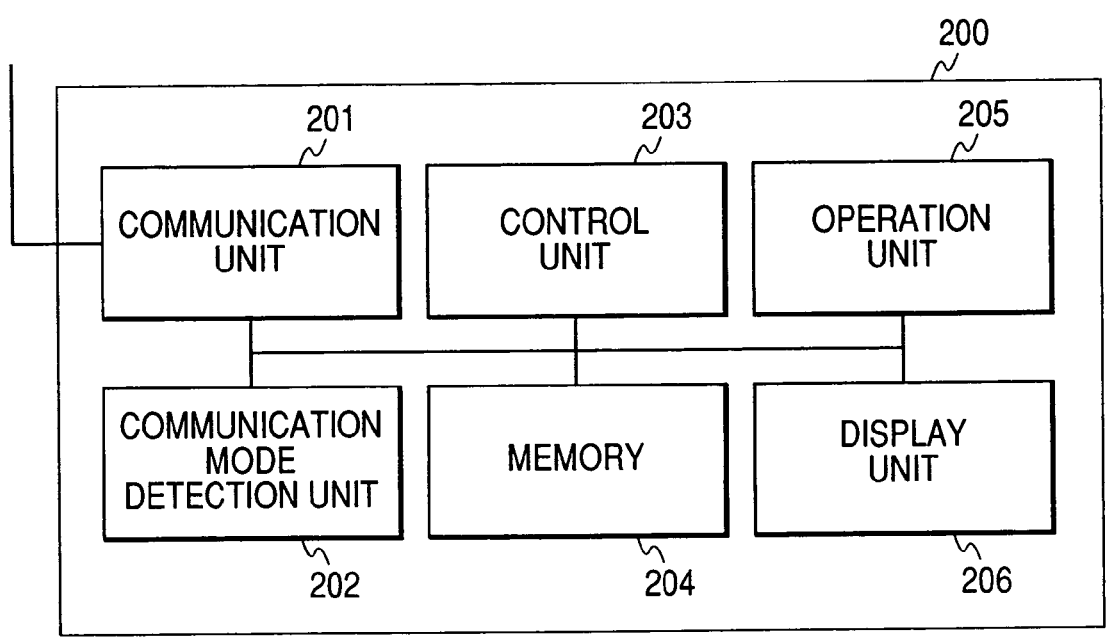
FIG. 1 is a block diagram showing a structure of a communication apparatus according to a first embodiment of the present invention.

A communication apparatus to which a communication control program according to a first embodiment of the present invention shown in FIGS. 1 to 4 is applied will be described below. FIG. 1 is a block diagram showing the structure of a communication apparatus 200. In FIG. 1, a reference numeral 201 denotes a communication unit, which is provided with a communication function and communicates to other equipments; a reference numeral 202 denotes a communication mode detection unit for detecting a current communication mode of the communication apparatus 200; a reference numeral 204 denotes a memory for storing time out value lists 301, 302 (to be described later), a default value and a setting value or the like in the communication control, and a communication control program according to the present embodiment; a reference numeral 205 denotes an operation unit for setting a communication mode and setting and changing a time out value; and a reference numeral 206 denotes a display unit for displaying the setting information or the like of the communication mode and the time out value. Further, a reference numeral 203 denotes a control unit for discriminating a communication mode on the basis of a detection signal from the communication mode detection unit 202, reading the time out value corresponding to the detection from the memory 204, and outputting a communication control signal to the communication unit 201.

In the meantime, this communication apparatus is applied as a communication apparatus that is mounted on, for example, an image capture apparatus such as a digital camera and a digital video camera, a computer, and a peripheral equipments or the like. In addition, the communication control program according to the present embodiment may be installed on the existing communication apparatus that is mounted on the image capture apparatus and the computer and this communication control program is applicable to the communication apparatus which is integrally or detachably mounted on the image capture apparatus and the computer. Accordingly, the present communication control program can be applied to a device provided even with a communication function, and the operation unit 205 and the display unit 206 may be configured by the operation unit and the display unit to be mounted on the image capture apparatus, the computer, and the peripheral equipments or the like.

Figure 2A:
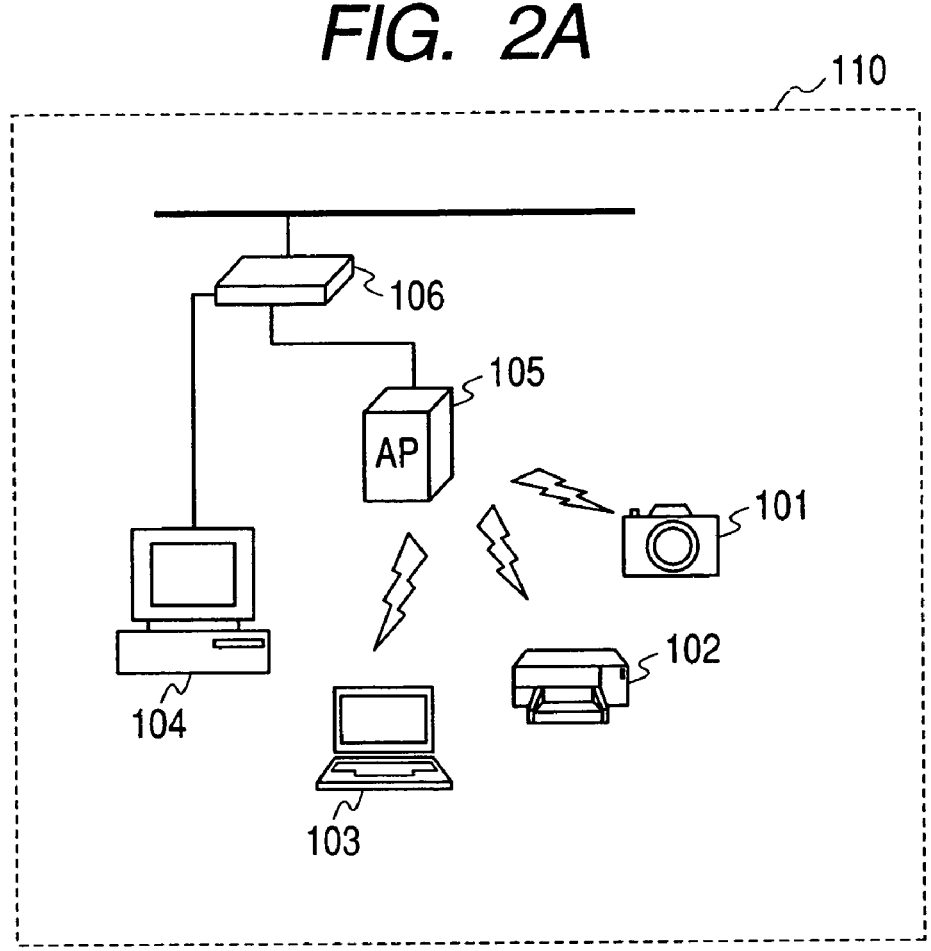
FIGS. 2A and 2B are a view showing a communication structure according to the first embodiment of the present invention.
Figure 2B:
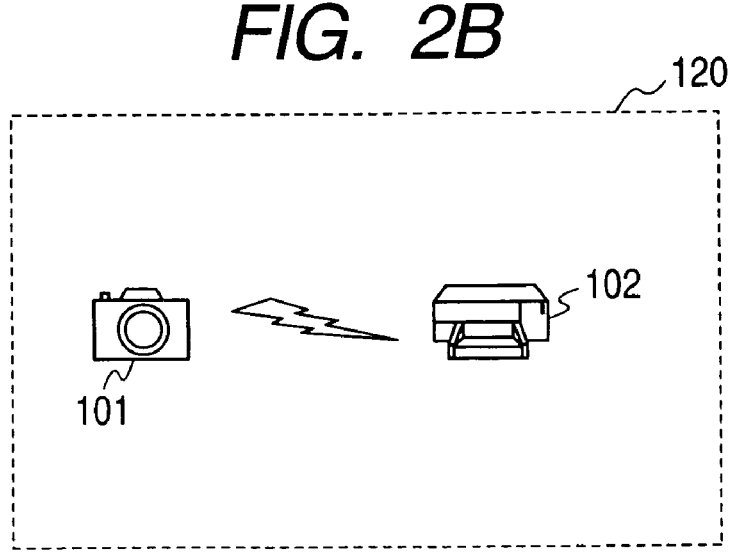

FIGS. 2A and 2B are network block diagrams of the communication apparatus 200 according to the present embodiment. FIG. 2A shows an infrastructure mode 110 in a wireless LAN. In this infrastructure mode 110, an image capture apparatus 101, a printer 102, and a computer 103 are wirelessly connected via an access point 105, and a computer 104 forms a local area network of a wired connection via an access point 105 and a router 106. This access point 105 not only plays a roll as the connection point when the computer 104 is connected to Internet but also is a connection point to be relayed when the computer 104 is wirelessly connected to the network (LAN) or the like.

On the other hand, FIG. 2B shows an AD hoc mode 120 in the wireless LAN and the image capture apparatus 101, and the printer 102 are directly wireless-connected without the access point 105 to form an AD hoc network.

FIGS. 3A and 3B show time out value lists 301 and 302 according to the present embodiment, which are stored in the memory 204. The time out value 301 of addressing, whereby the image capture apparatus 101 acquires and sets an IP address of itself, and the search time out value 302 for retrieving the peripheral equipments and the peripheral services are set for each communication mode, namely, for each infrastructure mode 110 and each AD hoc mode 120.

Here, the time out value means a time of compulsorily terminating the operation of the system regardless of normal or error in order to prevent the entire system from being stopped in the case that a bus cycle and a command request are not completed over a specified time.

Figure 4:
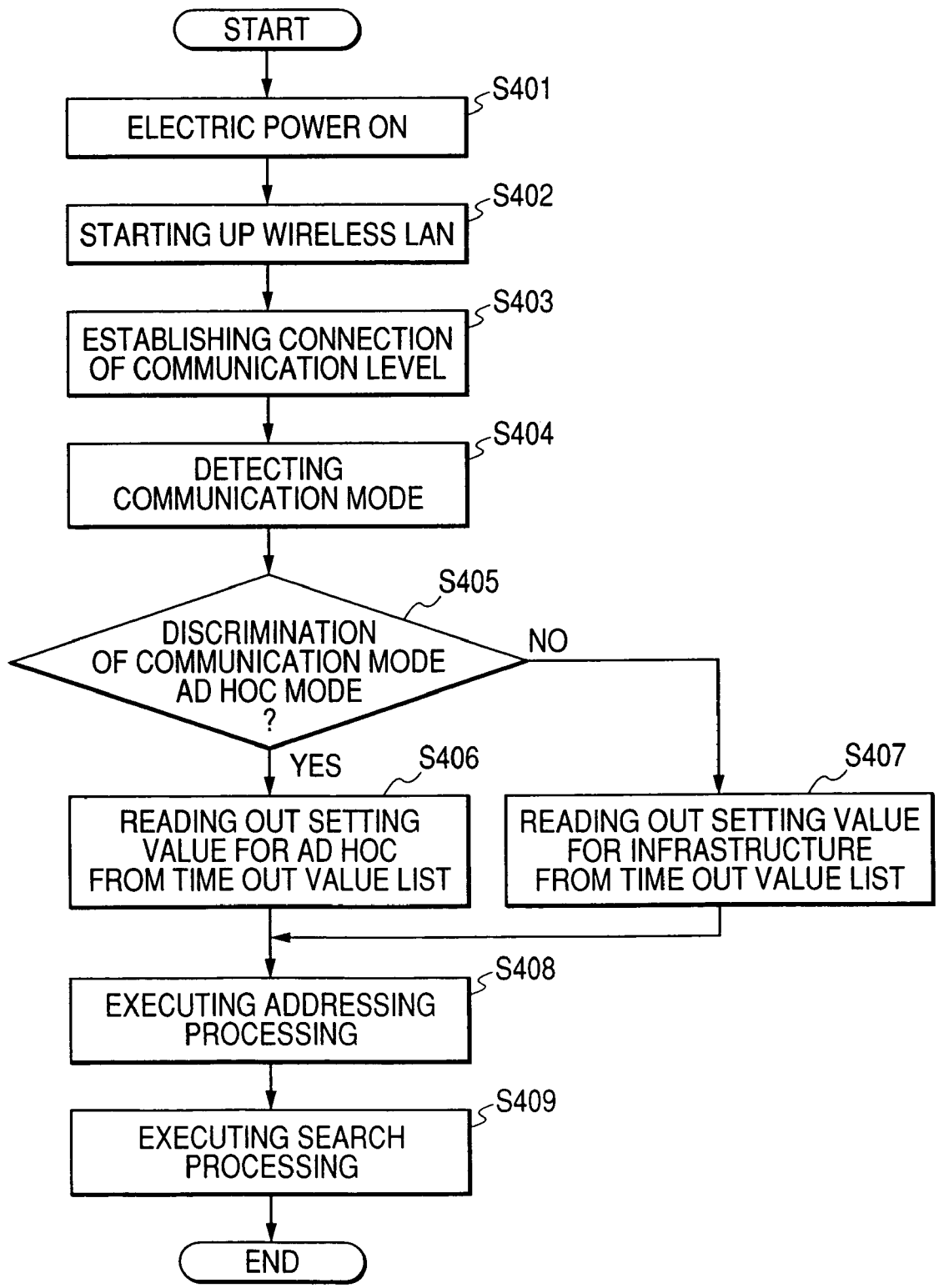
FIG. 4 is an operational flow chart of the communication control according to the first embodiment of the present invention.

Next, the specific operation of the present embodiment will be described below. FIG. 4 is an operational flow chart of the communication control according to the present embodiment.

As shown in FIGS. 2A and 2B, the image capture apparatus 101 can perform communication in the infrastructure mode 110 and the AD hoc mode 120 as a plurality of communication modes, and in the infrastructure mode 110 of FIG. 2A, the router 106 has a function of a DHCP server to manage the addresses of the image capture apparatus 101, the printer 102, and the computers 103 and 104 within the network. In the AD hoc mode 120 of FIG. 2B, the image capture apparatus 101 and the printer 102 have no function of the DHCP server.

In the image capture apparatus 101, at first, upon powering on from the operation unit 205 (S401) and starting up the wireless LAN (S402), the image capture apparatus 101 may establish a connection (a communication path) of a communication level (a wireless LAN level) via the communication unit 201 (S403).

In the meantime, this establishment of the communication connection can be determined, for example, when connection has been established at a session layer in a model layer of a communication protocol, however, practically, establishment of the communication connection may be determined when the communicable condition is made by the communication unit 201 and the image capture apparatus 101 can shift to the processing to be described later in accordance with various communication standards on the basis of arbitrary criterion of judgment.

Then, the control unit 203 may carry out the processing on the basis of a step of the communication control program read out from the memory 204. At first, the control unit 203 outputs a communication mode detection signal to the communication mode detection unit 202. The communication mode detection unit 202 detects a communication mode from the communication unit 201, outputs the information with respect to this communication mode to the control unit 203, and discriminates the communication mode (S404).

Storing the operational condition of the communication unit 201 as the information with respect to this communication mode for each communication mode, the control unit 203 outputs a flag or the like corresponding to this communication mode and directly detecting a condition of the communication unit 201 (for example, the condition, the standard, and the system or the like of a chip to be mounted on the communication circuit configuring the wireless LAN), it discriminates if the communication mode is the infrastructure mode 110 or the AD hoc mode 120.

In the discrimination of the communication mode, if the communication mode is discriminated to be the AD hoc mode 120 (S405), the control unit 203 reads out the time out value for the AD hoc mode 120 from the time out value lists 301 and 302 stored in the memory 204 (S406), and using this value, it executes the addressing processing (S408).

In this time, as shown in FIG. 3A, since the time out value of addressing at the AD hoc mode 120 is set at DHCP: 2 sec×1, Auto IP: 2 sec on the time out value list 301 and there is no DHCP server in the AD hoc network, after 2 sec of the addressing by DHCP becomes time out, Auto IP is executed for 2 sec, and the IP address of the image capture apparatus 101 is decided.

After that, the search processing is carried out (S409), however, as shown in FIG. 3B, the search time out value at the AD hoc mode 120 is set at 3 sec on the time out value list 302, so that, after transmission of the search message, a search response takes three seconds.

In the step 405, when the communication mode is discriminated to be the infrastructure mode 110, in the same way, reading out the time out value for the infrastructure mode 110 from the time out value lists 301 and 302 stored in the memory 204 (S407) and using this value, the addressing processing is then carried out (S408). In this time, since the time out value at the infrastructure mode 110 is set at DHCP: 6 sec×4, Auto IP: 2 sec on the time out value list 301 and there is a DHCP server in the router 106 of the infrastructure network, the IP address of the image capture apparatus 101 is decided due to the addressing by the DHCP.

Then, executing the search processing (S409), the search time out value of the infrastructure mode 110 is set at 5 sec on the time out value list 302, so that, after transmission of the search message, a search response takes five seconds.

Accordingly, according to the conventional communication control, for example, when the time out value at the infrastructure mode is set as a common time out value, there is no problem in the case of communication in the infrastructure mode, while when the communication is made in the AD hoc mode without the DHCP server 24 seconds (6 sec×4) is spent for the addressing by the DHCP server and finally, the IP address of the local apparatus itself is decided by the Auto IP, thereby resulting in spending 26 seconds in total. According to the present embodiment, by discriminating the current communication modes of the image capture apparatus 101, the printer 102, and the computers 103 and 104, and selecting the optimum time out value for this communication mode, the current time out value is changed into this optimum time out value.

Therefore, in the case that there is the DHCP server in the network at the infrastructure mode, the IP address of the local apparatus itself is decided for about six seconds, so that it is possible to immediately start the optimum communication for a network formation to be used and a processing waiting time for the user can be made shorter.

In addition, according to the conventional communication control, in searching of the peripheral equipment and the service, even if it seems that not so many devices are located in the same network as the AD hoc mode, a search response takes five seconds. As a result, a responsibility is lowered and the operability of the user is also lowered. However, according to the present embodiment, the search response takes about three seconds in the AD hoc mode, so that the operability of the user can be improved as same as the infrastructure mode.

Further, according to the conventional communication control, for example, when the time out value at the AD hoc mode is set as a common time out value, there is no problem in the case of communication in the AD hoc mode, while when the communication is made in the infrastructure mode, since the time out value of the addressing by the DHC server is 2 sec, the appropriate processing with respect to the DHCP server cannot be executed and it is feared that the user cannot correctly enter the network. In addition, in searching of the peripheral equipment and the service, even if it seems that many devices are located in the same network as the infrastructure mode, the search response takes three seconds. As a result, desired device and service may not be detected.

However, according to the communication control of the present embodiment, even in searching of the peripheral equipment and the service, it is possible to search them in accordance with the number of peripheral equipments to be subjected to search. Since the communication mode (the connected network) to which the image capture apparatus 101 is connected is discriminated from the information included in itself, the user can carry out the processing at a high speed.

In the meantime, this time out value list may be set in advance upon shipment of the image capture apparatus 101, or the user himself or herself can set this time out value list in accordance with the using condition, or this time out value list may be also available for various time out values other than the time out value of the addressing and the time out value of the peripheral equipments and the service.

Second Embodiment

Figure 5A:
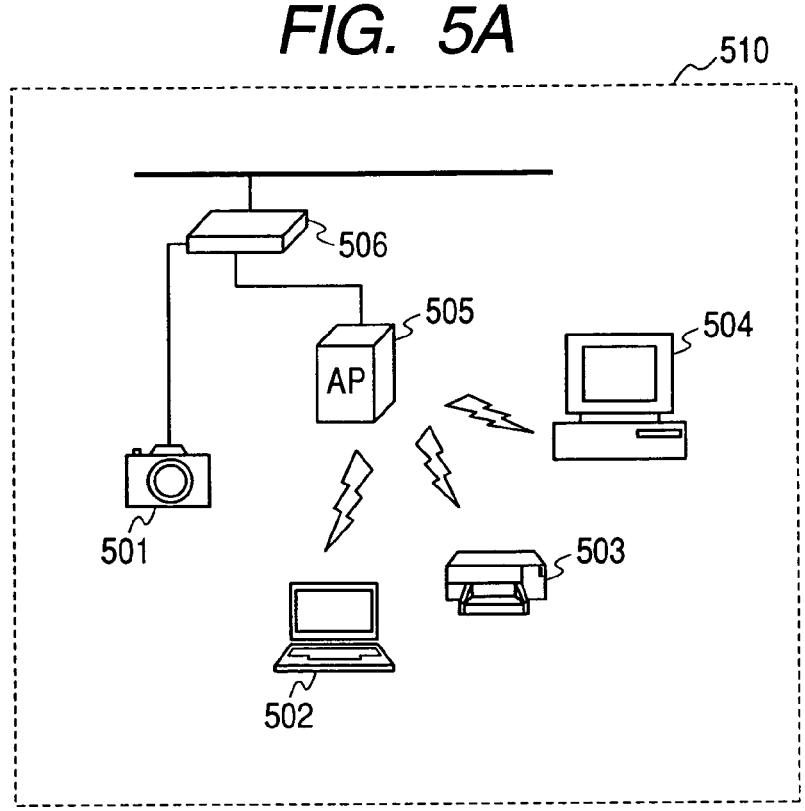
FIGS. 5A and 5B are a view showing a communication structure according to a second embodiment of the present invention.
Figure 5B:
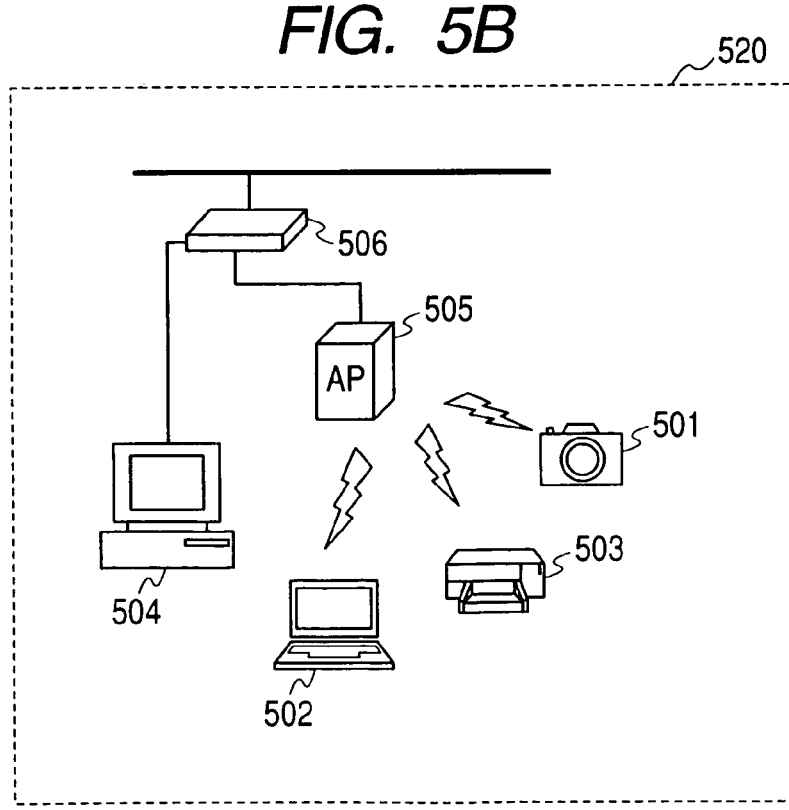

FIGS. 5A and 5B are views showing a communication structure of a communication apparatus 200 according to the second embodiment of the present invention. In the meantime, since the communication apparatus 200 has the same structure as the above-described first embodiment, its explanation is herein omitted.

According to the present embodiment, in a wired LAN mode 510, an image capture apparatus 501 shown in FIG. 5A is connected to a router 506 with a wire (Ethernet: registered trademark) to carry out communication, and in a wireless LAN mode 520, an image capture apparatus 501 shown in FIG. 5B is connected to the router 506 by the wireless LAN via an access point 505.

FIGS. 6A and 6B show time out value lists 601 and 602 that are used in the present embodiment and a time out value 601 of the addressing, whereby the image capture apparatus 501 acquires and sets the IP address of itself, and a search time out value 602, whereby the image capture apparatus 501 retrieves the peripheral equipments and the peripheral service, is set for each communication mode, namely, for each wired LAN mode 510 and for each wireless LAN mode 520.

Figure 7:
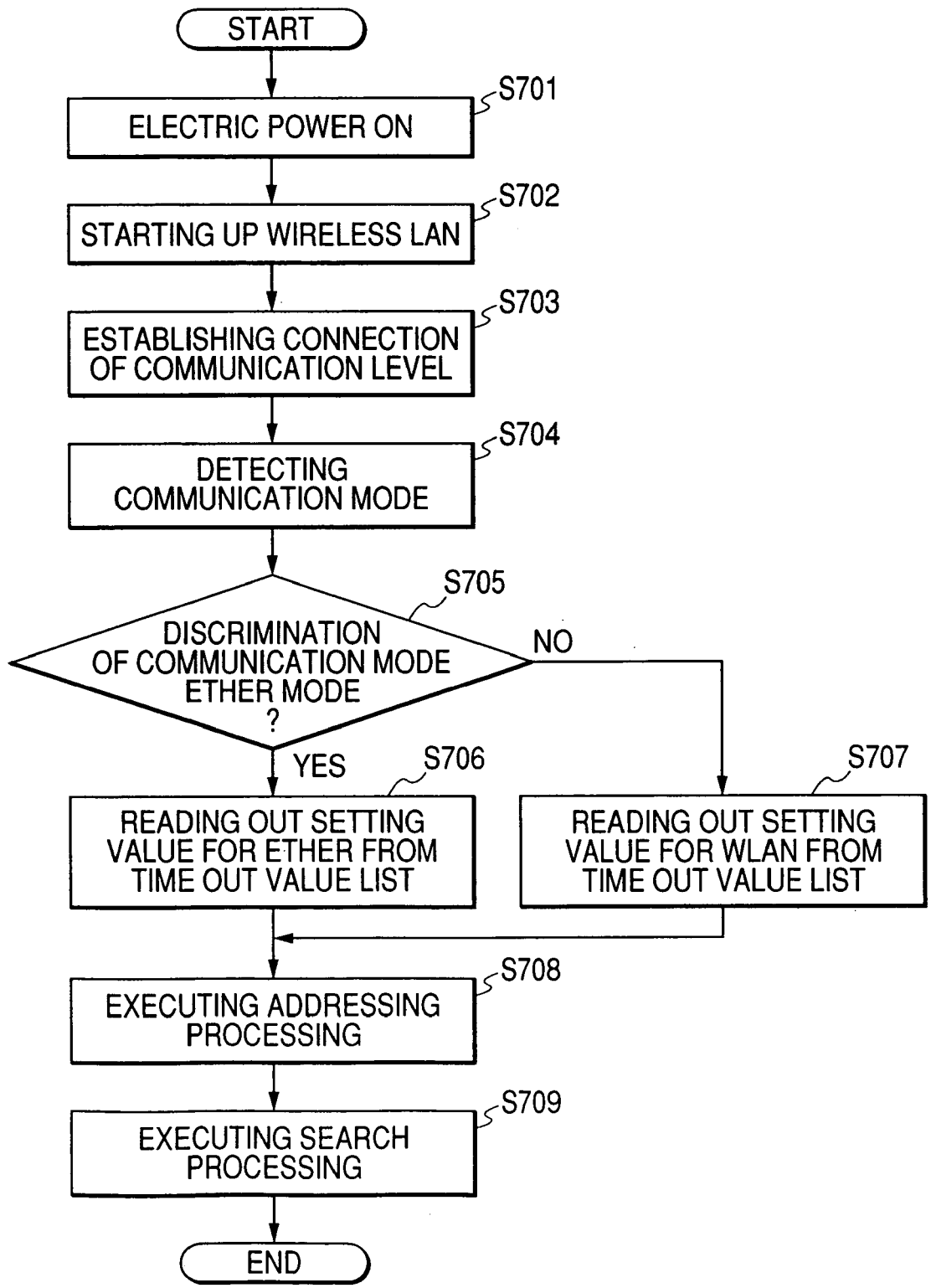
FIG. 7 is an operational flow chart of the communication control according to the second embodiment of the present invention.

FIG. 7 is a flow chart of the present embodiment. The specific processing and operation of the present embodiment will be described below.

As shown in FIGS. 5A and 5B, the image capture apparatus 501 can perform the communication in the wired LAN mode 510 and the wireless LAN mode 520 as the communication mode. In each communication mode, the router 506 has a function of the DHCP server to manage the addresses of the image capture apparatus 501, the printer 503, and the computers 502 and 504 within the network.

At first, when electricity is powered on from the operation unit 205 in the image capture apparatus 501 (S701), the wireless (wire) LAN is started up (S702), and the image capture apparatus 501 establishes a connection of a communication level via the communication unit 201 (S703).

Then, the control unit 203 carries out the processing on the basis of a step of the communication control program read out from the memory 204. At first, the control unit 203 outputs a communication mode detection signal to the communication mode detection unit 202. The communication mode detection unit 202 detects a communication mode from the communication unit 201, outputs the information with respect to this communication mode to the control unit 203, and discriminates the communication mode (S704).

According to the discrimination processing of the communication mode in this step 704, the communication mode detection unit 202 detects a condition of a network driver of the image capture apparatus 501 itself and discriminates if the communication mode is the wired LAN mode 510 or the wireless LAN mode 520.

In the discrimination of the communication mode, if the communication mode is discriminated to be the wired LAN 510 (S705), the control unit 203 reads out the time out value for the wired LAN 510 from the time out value lists 601 and 602 stored in the memory 204 (S706), and using this value, it executes the addressing processing (S708). In this time, the time out value of addressing at the wired LAN mode 510 is set at DHCP: 6 sec×3, Auto IP: 2 sec on the time out value list 601 and the IP address of the image capture apparatus 501 is decided by the addressing due to the DHCP with respect to the router 506.

After that, carrying out the search processing (S709), the search time out value at the wired LAN mode 510 is set at 4 sec on the time out value list 602, so that, after transmission of the search message, a search response takes four seconds.

In the discrimination of the communication mode in the step 705, when the communication mode is discriminated to be the wireless LAN mode 520, in the same way, the time out value for the wireless LAN mode 520 is read out from the time out value lists 601 and 602 stored in the memory 204 (S707), and using this value, the addressing processing is carried out (S708). In this time, since the time out value at the wireless LAN mode 520 is set at DHCP: 6 sec×4, Auto IP: 2 sec on the time out value list 601, the IP address of the terminal 501 is decided due to the addressing by the DHCP with respect to the router 506. After that, carrying out the search processing (S709), the search time out value in the wireless LAN mode 520 is set at 5 sec on the time out value list 602, so that, after transmission of the search message, a search response takes five seconds.

Thus, according to the present embodiment, each of the image capture apparatus 501, the printer 503, and the computers 502 and 504 discriminate the present communication mode, and by changing the time out value between a wired network (Ethernet) and the wireless LAN (WLAN) of which transfer rate and reliability of communication are low as compared to the wired network, the addressing and the search suited to the usage format (the communication format) of the image capture apparatus 501, the printer 503, and the computers 502 and 504 or the like can be realized and this results in improvement of the convenience of the user. Other operations and advantages are the same as the above-described embodiment 1.

Third Embodiment

Figure 8:
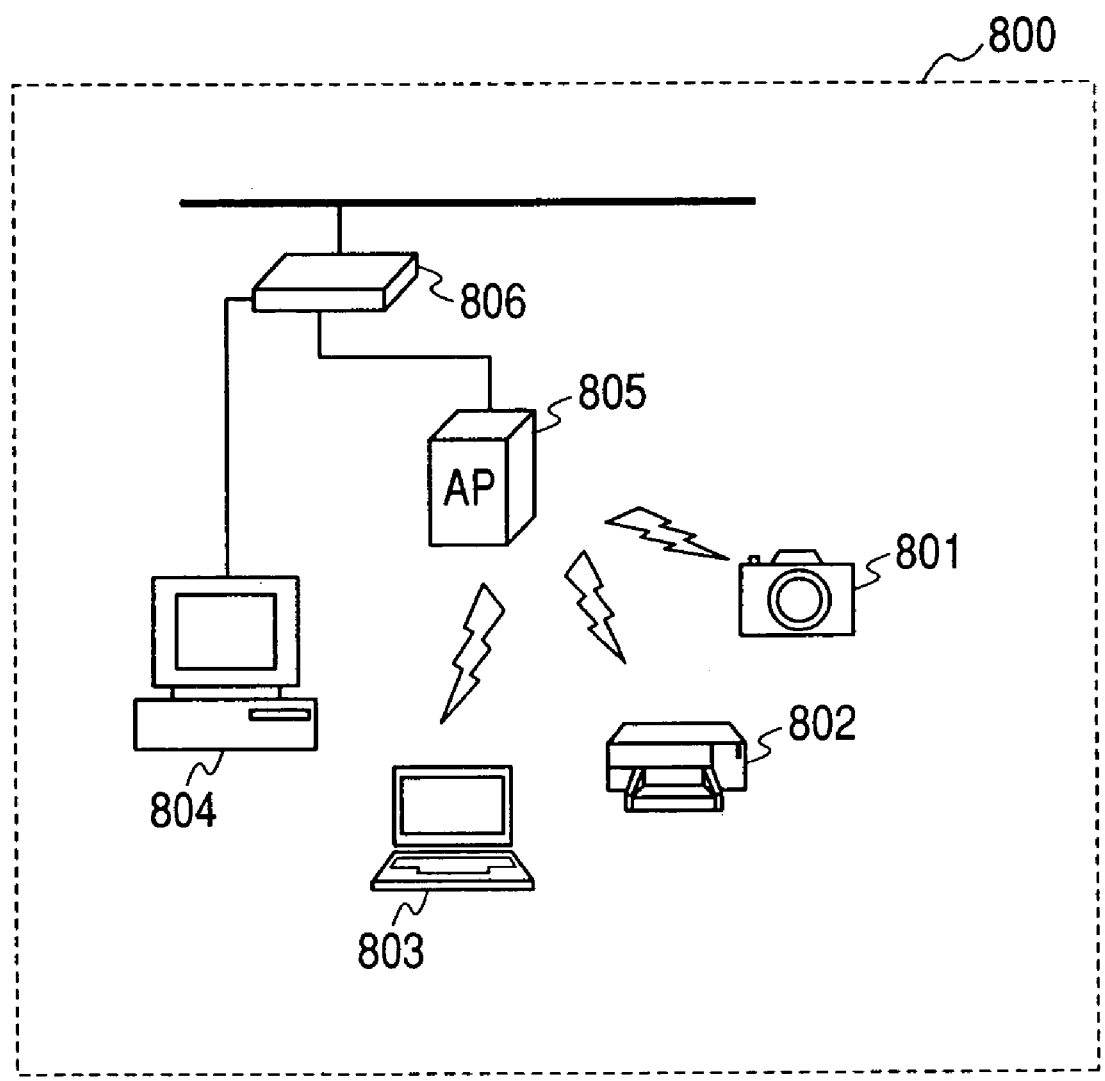
FIG. 8 is a view showing a communication structure according to a third embodiment of the present invention.

FIG. 8 is a view showing a communication structure of a communication apparatus 800 according to the third embodiment of the present invention. In FIG. 8, an image capture apparatus 801 is connected to a router 806 via an access point 805 to perform communication and has a 11 Mbps mode, a 5.5 Mbps mode, a 2 Mbps mode, and a 1 Mbps mode for each link level of the wireless LAN, namely, for each transmission rate (a transmission speed), respectively. In the meantime, since the communication apparatus according to the present embodiment has the same structure as the above-described first embodiment, its explanation is herein omitted.

FIGS. 9A and 9B show time out value lists 901 and 902 to be used for the present embodiment and a time out value 901 of the addressing, whereby the image capture apparatus 801 acquires and sets the IP address of itself, and a search time out value 902, whereby the image capture apparatus 801 retrieves the peripheral equipments and the peripheral service, is set for each communication mode.

FIG. 10 is a flow chart of the present embodiment. The specific processing and operation of the present embodiment will be described below.

As shown in FIG. 8, the image capture apparatus 801 can perform the communication in the 11 Mbps mode, the 5.5 Mbps mode, the 2 Mbps mode, and the 1 Mbps mode as a plurality of communication modes. In each communication mode, the router 806 has a function of the DHCP server to manage the addresses of the image capture apparatus 801, the printer 802, and the computers 803 and 804 within the network.

When electricity is powered on from the operation unit 205 in the image capture apparatus 801 (S1001), the wireless LAN is started up (S1002), and the image capture apparatus 801 establishes a connection of a communication level via the communication unit 201 (S1003) so as to discriminate the communication mode (S1004).

According to the discrimination processing of the communication mode in this step 1004, the communication mode detection unit 202 detects the communication condition of the image capture apparatus 801 itself (the chip condition of the wireless LAN or the like) and discriminates if the communication mode is the 11 Mbps mode, the 5.5 Mbps mode, the 2 Mbps mode, or the 1 Mbps mode.

In the discrimination of the communication mode, if the communication mode is discriminated to be the 11 Mbps mode (S1004), the control unit 203 reads out the time out value for the 11 Mbps mode from the time out value lists 901 and 902 stored in the memory 204 (S1006), and using this value, it executes the addressing processing (S1010). In this time, the time out value of addressing at the 11 Mbps mode is set at DHCP: 6 sec×4, Auto IP: 2 sec on the time out value list 901 and the IP address of the image capture apparatus 801 is decided by the addressing due to the DHCP with respect to the router 806.

After that, carrying out the search processing (S1011), the search time out value at the 11 Mbps mode is set at 5 sec on the time out value list 902, so that, after transmission of the search message, a search response takes five seconds.

In the discrimination of the communication mode in the step 1005, when the communication mode is discriminated to be the 5.5 Mbps mode, the time out value for the 5.5 Mbps mode is read out from the time out value lists 901 and 902 stored in the memory 204 (S1007), and using this value, the addressing processing is carried out (S1010). In this time, since the time out value at the 5.5 Mbps mode is set at DHCP: 7 sec×4, Auto IP: 2 sec on the time out value list 901, the IP address of the image capture apparatus 801 is decided due to the addressing by the DHCP with respect to the router 806.

After that, carrying out the search processing (S1011), the search time out value in the 5.5 Mbps mode is set at 6 sec on the time out value list 902, so that, after transmission of the search message, a search response takes six seconds.

As same as the above, also in each of the 2 Mbps mode and the 1 Mbps mode, the time out value of each mode is read out from the time out value lists 901 and 902 (S1008, S1009), the addressing and the search are carried out at each setting value.

Thus, according to the present embodiment, the image capture apparatus 801 discriminates the present communication mode, and by changing the time out value for each transmission rate, the addressing and the search taking into consideration delay due to the current communication rate can be realized and this results in improvement of the convenience of the user. Other operations and advantages are the same as the above-described embodiment 1.

Fourth Embodiment

Figure 11A:
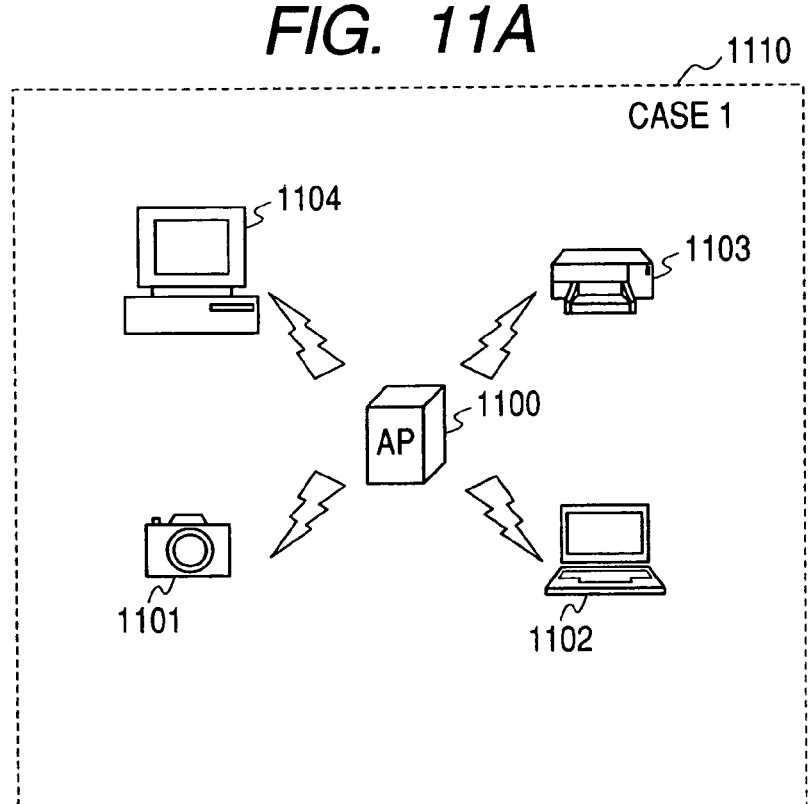
FIGS. 11A and 11B are views showing a communication structure according to a fourth embodiment of the present invention.
Figure 11B:
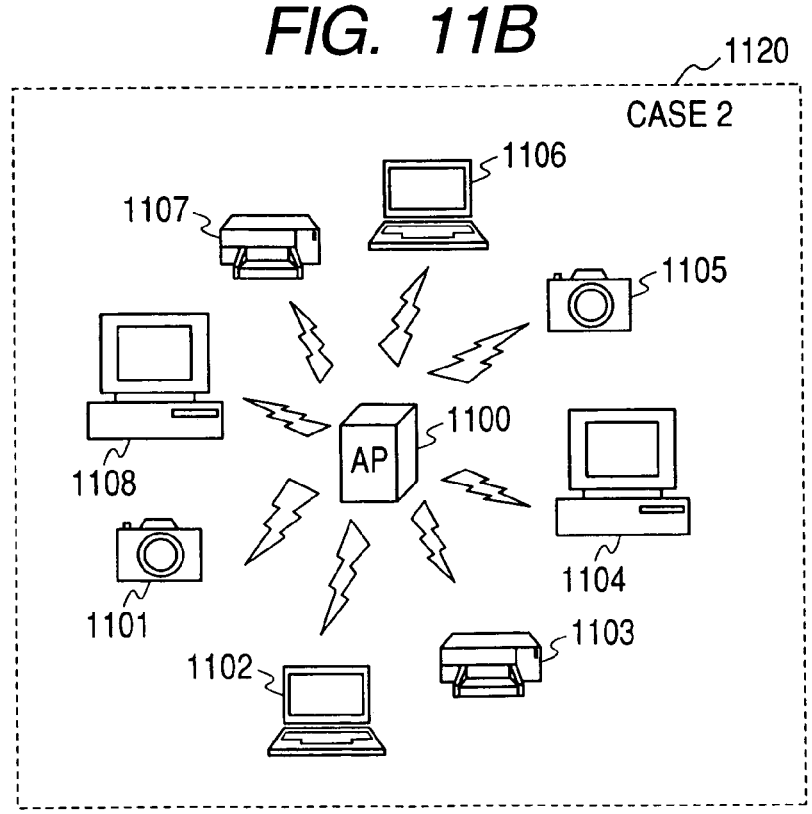

FIGS. 11A and 11B show a communication structure according to the fourth embodiment of the present invention. In FIGS. 11A and 11B, an image capture apparatus 1101 forms a wireless LAN network via an access point 1100, and show the case that the number of connectable terminals at the access point 1100 is small (Case 1 mode 1110) and the case that the number thereof is large (Case 2 mode 1120).

Since the communication apparatus according to the present embodiment has the same structure as the above-described communication apparatus 200 shown in FIGS. 2A and 2B of the first embodiment, its explanation is herein omitted.

FIG. 12 shows a time out value list 1201 to be used for the present embodiment, and in FIG. 12, a default value is set as a reference for determining a search time out value when a terminal 1101 retrieves the peripheral equipments and the peripheral service and if the number of connectable terminals at the access point 1100 is large or small.

FIG. 13 is a flow chart of the present embodiment. The specific processing and operation of the present embodiment will be described below.

As shown in FIGS. 11A and 11B, the access point 1100 always manages the number of terminals to establish communications and has a function to send the number of connectable terminals in response to the inquiry processing of the number of connectable terminals by terminals 1101 to 1108.

When electricity is powered on from the operation unit 205 in the image capture apparatus 1101 (S1301), the wireless LAN is started up (S1302), and the image capture apparatus 1101 establishes a connection of a communication level (a wireless LAN level) via the communication unit 201 (S1303) so as to execute the addressing processing (S1304). In the meantime, this addressing processing may be realized by any processing among the above-described embodiments and other processing method is also applicable.

Then, the image capture apparatus 1101 inquires the number of terminals of the access point 1100 (S1305) and waits for the response from the access point 1100 (S1306). Receiving the response from the access point 1100, the image capture apparatus 1101 executes the determination processing of the number of connectable terminals by using the default value stored in a time out value list 1201 (S1307).

In the Case 1 mode 1110 in FIG. 11A, if the number of connectable terminals at the access point 1100 is less than or equal to the default value, the setting value 3 sec for the case that the number of connectable terminals is less than or equal to the default value is read out from the time out value list 1201, and the image capture apparatus 1101 executes the search processing (S1311).

In addition, in the case that the number of connectable terminals at the access point 1100 is greater than the default value in the Case 2 mode 1120 shown in FIG. 11B, or in the case that there is no response from the access point 1100, the image capture apparatus 1101 reads out the setting value 5 sec greater than the reference value from the time out value list 1201 to execute the search processing (S1311).

Thus, according to the present embodiment, by inquiring the number of the current contactable terminals at the access point and changing the time out value on the basis of the number of terminals, it is possible to realize the search while grasping the current condition of the network in detail. This results in improvement of convenience of the user and realizing of the same operation and advantage as the above-described first embodiment.

In the meantime, for example, the default value shown in FIG. 12 may be set based on the estimated traffic amount in the number of connectable terminals forming the network and the reference value can be set arbitrarily on the basis of the network.

As described above, according to the above-described embodiments, in each of the communication modes such as performing the communication via the access point or not; the wired communication or the wireless communication; the condition of the information transmission rate; and the number of the devices capable of communication, the time out value is changed. However, the combination of these communication modes is also possible, and by adding the processing of newly making the time out value list in accordance with the communication of these communication modes or setting the time out value by the user, it is possible to set the optimum time out values for various communication modes.

In addition, the communication mode is not limited to the above-described embodiments. For example, upon exchanging of the files between the devices, the time out value may be changed in the communication mode of giving a priority to an image quality or a speed, and it is also possible to change the time out value in accordance with the communication system and the performances of the image capture apparatus and the computer.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-269527 filed Sep. 16, 2004, which is hereby incorporated by reference herein.

What is claimed is:

1. A communication apparatus, comprising:
   a communication mode detecting unit that detects whether a communication mode is a first wireless communication mode or a second wireless communication mode; and
   an IP address determining unit that (a) determines an IP address using first and second time out values if the communication mode detecting unit detects that the communication mode is the first wireless communication mode, and (b) determines an IP address using third and fourth time out values if the communication mode detecting unit detects that the communication mode is the second wireless communication mode, the first and third time out values being used for a first addressing method, and the second and fourth time out values being used for a second addressing method different from the first addressing method.

2. The communication apparatus according to claim 1, further comprising a memory that stores the first and second time out values and the third and fourth time out values.

3. The communication apparatus according to claim 1, wherein the communication apparatus communicates with an external device by wireless via an access point if the communication apparatus is in the first wireless communication mode, and the communication apparatus communicates with an external device by wireless without via an access point if the communication apparatus is in the second wireless communication mode.

4. The communication apparatus according to claim 3, wherein the first wireless communication mode is an infrastructure mode in a wireless LAN, and the second wireless communication mode is an ad hoc mode in a wireless LAN.

5. The communication apparatus according to claim 1, wherein the first addressing method uses a DHCP server, and the second addressing method uses AutoIP.

6. A method of controlling a communication apparatus, comprising:
- a communication mode detecting step of detecting whether a communication mode is a first wireless communication mode or a second wireless communication mode; and
- an IP address determining step of (a) determining an IP address using first and second time out values if it is detected in the communication mode detecting step that the communication mode is the first wireless communication mode, and (b) determining an IP address using third and fourth time out values if it is detected in the communication mode detecting step that the communication mode is the second wireless communication mode, the first and third time out values being used for a first addressing method, and the second and fourth time out values being used for a second addressing method different from the first addressing method.

7. The method according to claim 6, wherein the communication apparatus has a memory that stores the first and second time out values and the third and fourth time out values.

8. The method according to claim 6, wherein the communication apparatus communicates with an external device by wireless via an access point if the communication apparatus is in the first wireless communication mode, and the communication apparatus communicates with an external device by wireless without via the access point if the communication apparatus is in the second wireless communication mode.

9. The method according to claim 8, wherein the first wireless communication mode is an infrastructure mode in a wireless LAN, and the second wireless communication mode is an ad hoc mode in a wireless LAN.

10. The method according to claim 6, wherein the first addressing method uses a DHCP server, and the second addressing method uses AutoIP.

* * * * *